United States Patent [19]
Mao

[11] Patent Number: 5,481,966
[45] Date of Patent: Jan. 9, 1996

[54] COOKING APPARATUS, AND METHODS OF CONSTRUCTING AND UTILIZING SAME

[76] Inventor: Tchong C. Mao, 15319 Pleasant Valley, Houston, Tex. 77062

[21] Appl. No.: 289,639

[22] Filed: Aug. 12, 1994

[51] Int. Cl.[6] ................................................ A47J 37/10
[52] U.S. Cl. ................................ 99/425; 88/446; 88/447
[58] Field of Search ........................... 99/422, 418, 447, 99/446, 400, 425, 394, 444; 126/373; 206/223, 576, 547

[56] References Cited

U.S. PATENT DOCUMENTS

| | | | |
|---|---|---|---|
| 1,076,383 | 10/1913 | Mendez | 99/394 |
| 1,272,222 | 7/1918 | Clayton . | |
| 1,356,432 | 10/1920 | Eidt . | |
| 2,652,768 | 9/1953 | Moreno . | |
| 2,667,117 | 1/1954 | Millard et al. . | |
| 3,777,653 | 12/1973 | Carruth | 99/422 |
| 3,908,534 | 9/1975 | Martin | 99/418 |
| 5,323,693 | 6/1994 | Collard et al. | 99/425 |

*Primary Examiner*—David Scherbel
*Assistant Examiner*—Reginald L. Alexander
*Attorney, Agent, or Firm*—Weiner, Carrier & Burt; Joseph P. Carrier; William F. Esser

[57] ABSTRACT

The invention pertains to a novel cooking utensil for use in cooking food together with a conventional cooking vessel such as a covered skillet. The cooking utensil comprises a thin, substantially planar food-supporting cooking member having a bottom surface shaped substantially identically to a lower, inner surface of the conventional cooking vessel so that the food supporting member will substantially completely cover the lower, inner surface of the cooking vessel in flush contact therewith when the food supporting member is placed in the vessel, and handle means integrally connected to a central portion of an upper surface of the food supporting member for lifting and handling the food supporting member. The food supporting member preferably has a uniform thickness significantly smaller than the thickness of a bottom wall portion of the cooking vessel, and a continuous surface so that fluid cannot pass therethrough during a cooking operation. Through use of the cooking utensil, the inner surface of the skillet remains substantially free of food particles and residue during a cooking operation so that the skillet may be directly, serially used in plural cooking operations without having to clean the skillet after each cooking operation, and while maintaining the skillet in a heated condition during and between all of the cooking operations.

14 Claims, 2 Drawing Sheets

COOKING APPARATUS, AND METHODS OF CONSTRUCTING AND UTILIZING SAME

BACKGROUND OF THE INVENTION

1. Field of the Invention

The invention relates generally to cooking apparatus and to methods of constructing and utilizing same. More particularly, the present invention pertains to a thin food-supporting cooking member which may be easily placed in or removed from a conventional cooking vessel such as a skillet so that food can be cooked within the cooking vessel without directly contacting or fouling the lower inner surface of the cooking vessel, and to an efficient, expeditious cooking method involving a cooking vessel and a plurality of the thin supporting members.

2. Description of Relevant Art

There are known food supporting members which are adapted to be inserted within a cooking vessel for supporting food within the vessel during a cooking operation. For example, U.S. Pat. Nos. 1,272,222 and 2,667,117 disclose two types of strainers or colanders which may be placed within another cooking vessel for cooking the food as supported by the colanders. According to conventional practices, the disclosed colanders have legs depending from the food supporting surfaces thereof so that the food will be supported in spaced relation above the surface of the cooking vessel during the cooking operation.

Somewhat similarly U.S. Pat. No. 1,356,432 discloses a cooking utensil which is adapted to be used with a frying pan for frying foods such as eggs. The utensil includes a flat perforated member having a beaded peripheral edge which supports the perforated member in slightly spaced relation above a surface of the inner pan, and a handle extending from the edge of the perforated member for raising and lowering the perforated member. Through use of such utensil fried foods are not fully immersed in grease while cooking, and grease is easily drained away from the cooked food when the utensil is lifted out of the frying pan.

Still further, U.S. Pat. No. 2,652,768 discloses a cooking pan having a plurality of perforated plates which may be adjustably arranged in a vertically spaced relationship so that different and large amounts of food may be cooked at the same time relative to a small portion of a stove or oven.

Although all of the foregoing known devices function adequately for their intended purposes, the food cooking processes achievable therewith are relatively slow due to the elevated condition of the food above a heated surface, requiring heat to be transferred through a medium such as steam, grease, etc.

Further, food particles and residue tend to pass through the perforated surfaces of the known devices onto surfaces of cooking vessels in which they are contained. This is disadvantageous because the cooking vessels, as well as the food supporting devices, must be cleaned of the food particles and residue after a cooking operation so that they will not contaminate other food items subsequently cooked in the vessels. Such cleaning is particularly disadvantageous in relation to large, heavy cooking vessels such as cast metal skillets, frying pans, etc. because these vessels retain substantial amounts of heat after a cooking operation and must be cooled down before they can be cleaned. Moreover, if the cooking vessels are to be immediately reused in another cooking operation after they are cleaned, additional time and energy will be wasted when the cooking vessel is initially reheated to the temperature it was at before it was cooled down to be washed.

As will be understood, known cooking vessels and food supporting inserts for cooking vessels have limitations and disadvantages associated therewith, and have as a whole failed to fulfill a great need in the art for a structurally simple food supporting member which may be used together with a conventional cooking vessel for rapidly and efficiently cooking food over a heat source.

SUMMARY OF THE INVENTION

The present invention has been developed to fulfill the above-discussed need in the art, as well as to provide an efficient cooking method using a conventional cooking vessel and a plurality of the food-supporting cooking members.

According to the invention there is provided a cooking utensil for use in cooking food together with a conventional cooking vessel, comprising: a food supporting member having a bottom surface shaped substantially identically to a lower inner surface of the conventional cooking vessel such that the food supporting member will substantially completely cover the lower inner surface of the cooking vessel in flush contact therewith when the food supporting member is placed in the conventional vessel; and handle means connected to the food supporting member for moving the food supporting member relative to the cooking vessel. The food supporting member preferably has a uniform thickness significantly smaller than a thickness of a bottom wall portion of the cooking vessel; the food supporting member will preferably be a thin, substantially planar member with continuous surfaces so that fluids cannot pass therethrough; and said handle means will preferably be a compact member fixed to a central portion of the upper surface of the food supporting member.

According to the invention there is also provided a method of cooking food, comprising the steps of: providing an open top cooking vessel with a lower portion disposed over a heat source; providing a food supporting member having a bottom surface shaped substantially identically to an inner surface of the lower portion of the cooking vessel; loading food onto the supporting member; placing the food-loaded food supporting member into the cooking vessel; heating the cooking vessel and the food-loaded supporting member to a predetermined temperature; adding a quantity of water to the heated cooking vessel and covering the vessel so as to enclose the food supporting member therein; continue heating the vessel for a predetermined period of time at which the food is cooked and the water is substantially completely evaporated and absorbed into the cooked food; and removing the loaded food supporting member from the cooking vessel.

Preferably, the method will include the use of a plurality of the food supporting members, steps of serially placing each of the food-loaded supporting members into the cooking vessel so as to serially cook the food supported on each of the food supporting members, and maintaining the cooking vessel in a heated condition during and between the steps of serially placing the food supporting members in the cooking vessel. Additionally, the method will also preferably involve pasta as the food loaded onto the food supporting members; the cooking vessel and food-loaded support members will be heated to a high temperature before the water is added such that the water flashes or quickly evaporates when it is added to the heated vessel; and the method will include an additional step of further heating the vessel and food supporting member at a reduced temperature for another predetermined period of time after the water is substantially fully evaporated and absorbed by the cooked food, so as to fry the food on the food supporting member.

It is an object of the invention to provide a cooking utensil which may be used together with a conventional cooking vessel such as a skillet for quickly and efficiently cooking foods.

It is another object of the invention to provide such a cooking utensil which eliminates a conventional need for cleaning the cooking vessel after cooking food therein, and permits the cooking vessel to be maintained in a heated condition as a plurality of food batches (as supported on a plurality of the cooking utensils, respectively) are serially heated in the cooking vessel one after the other.

It is a further object of the invention to provide such a cooking utensil having a compact handle integrally connected to a central portion of an upper, food supporting surface thereof so that the utensil may be easily and stably placed in and removed from the cooking vessel.

Another object of the invention is to provide such a cooking utensil which utilizes magnetic means for placing the utensil into and removing the utensil from the cooking vessel.

It is still another object of the invention to provide such a cooking utensil which is simple and economical to manufacture, and yet is also durable and easy to use.

A still further object of the invention is to provide a quick and cost efficient method of cooking foods such as pasta over a heat source using a conventional cooking vessel and a plurality of the discussed cooking utensils.

Another object of the invention is to provide an automated method of cooking foods such as pasta quickly and efficiently in a sequential and substantially continuous manner, utilizing a conventional cooking vessel and a plurality of the discussed cooking utensils.

Other objects, advantages and features of the invention will become apparent from the following detailed description which, when taken in conjunction with the annexed drawings, discloses a preferred embodiment of the present invention.

DETAIL DESCRIPTION OF THE PREFERRED EMBODIMENTS

Figure 1:
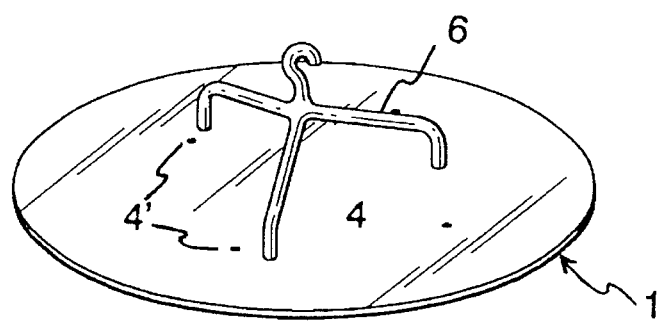
FIG. 1 is a perspective view of a cooking utensil according to the preferred embodiment of the invention.
Figure 2:
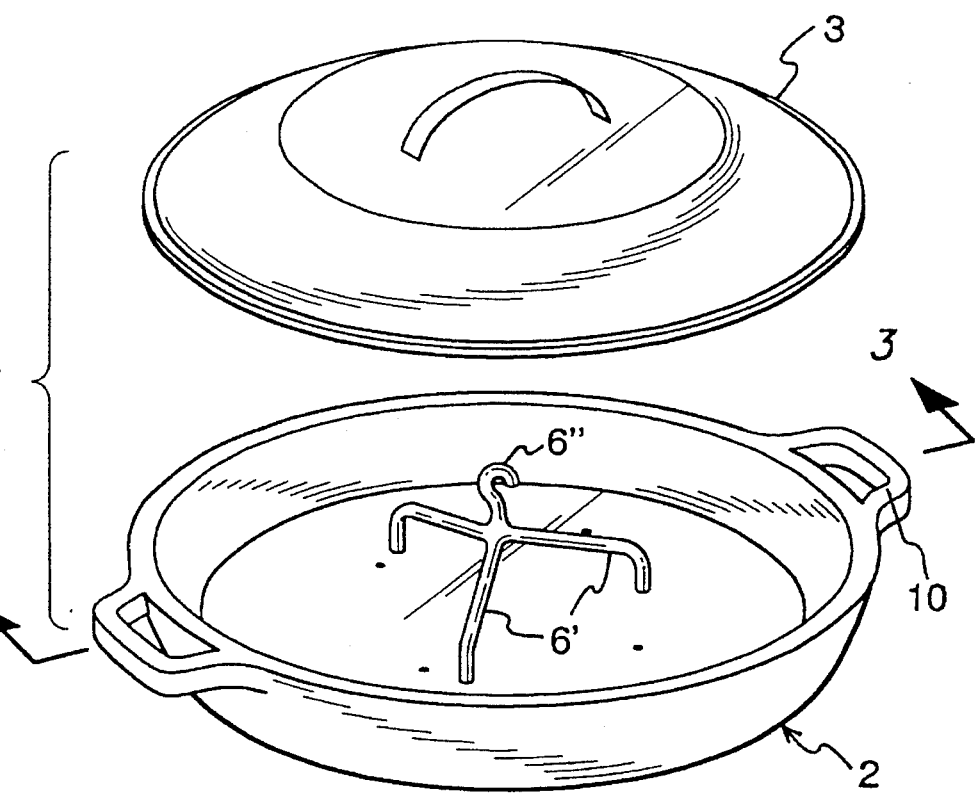
FIG. 2 is a perspective, and partially expanded view of a skillet having the cooking utensil according to the preferred embodiment placed therein.
Figure 3:
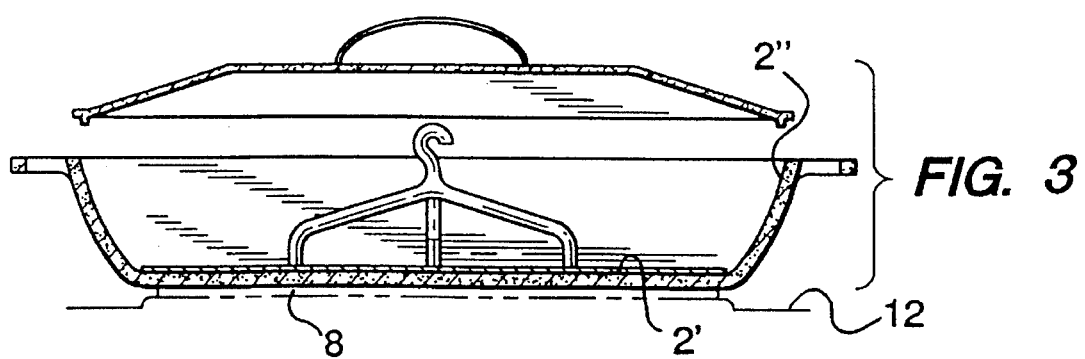
FIG. 3 is a cross-sectional view of the skillet and cooking utensil of FIG. 2 looking in the direction of line 3–3 in FIG. 2.

Referring to FIGS. 1–3, there is shown a cooking utensil 1 together with a skillet 2 having a cooking cavity defined therein and a cover 3 according to a preferred embodiment of the invention.

The cooking utensil 1 includes a plate 4 and a handle means 6 connected to a central portion of an upper, food supporting face of the plate and extends upwardly therefrom. The plate and handle means are preferably formed of metal such as steel or aluminum and the handle means is preferably connected to the plate 4 through welding, brazing or the like. With such type of connection between the handle means 6 and the plate 4, the connection does not form any projections or discontinuities in an opposite or bottom face of the plate 4, which is an important aspect of the invention as discussed further below.

Figure 4:
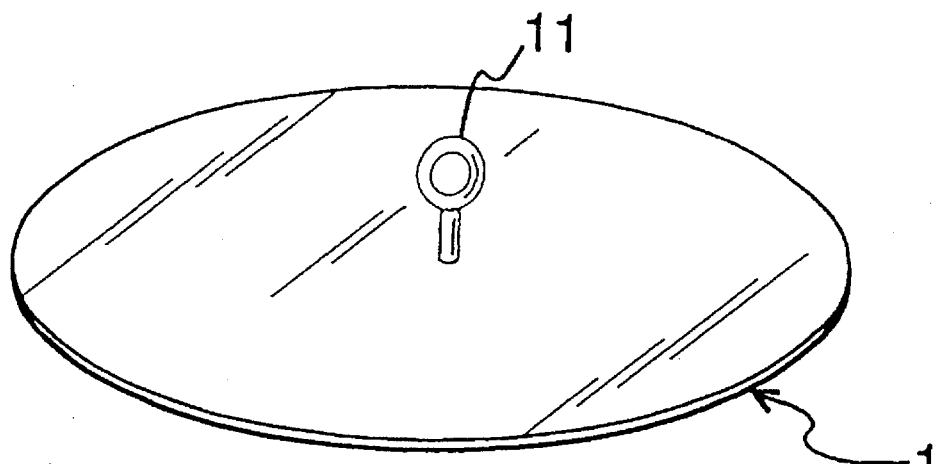
FIG. 4 is a cross-sectional view of a cooking utensil according to a second embodiment of the invention.

The handle means may have any appropriate configuration, but will preferably have three legs 6' with lower ends connected to the plate 4 in an equally spaced manner 120° apart from each other, middle sections extending towards each other, and upper ends joined together above a central point of the plate 4 and having a hook-shaped handle member 6" extending upwardly therefrom, as shown. Such structure of the handle means is desirably sturdy so that the cooking utensil may reliably and stably support relatively large quantities of food on the upper surface of the plate 4 when the handle member 6" is gripped and manipulated, and does not otherwise significantly interfere with placement and removal of food on the plate 4. Alternatively, the handle means includes a hook or loop member 11 which is connected to plate 1 in its center and extends upwardly therefrom (FIG. 4); or a substantially flat section, preferably in an elevated position relative to plate 4, for engagement with a magnet.

As best shown in FIG. 3, the handle means 6 is preferably relatively short and compact in a vertical direction such that when the utensil 1 is placed in the skillet 2 the legs 6' are fully disposed within the skillet below an upper surface thereof, and the handle member 6" extends slightly above the upper surface of the skillet 2 such that when the dome-shaped lid 3 is place on the skillet the handle member 6" is disposed below an inner surface of the lid 3. Thus, the cooking utensil 1 will be completely enclosed within a cooking space defined by the skillet 2 and the lid 3 during a cooking operation.

The hook shape of the handle member 6" permits it to be easily engaged and lifted or lowered using a simple tool such as a straight rod or stick having a diameter which is smaller than the curved inner radius of the handle member 6", or a rod having a hook member formed on one end thereof shaped to operatively engage the hook-shaped handle member 6". As understood from the following discussion, the cooking utensil 1 including the handle means 6 would be extremely hot immediately after a cooking operation, such that the utensil 1 should be lifted out of the skillet 2 using a tool to engage handle member 6".

The plate 4 is preferably constructed of a thin, sturdy material such as sheet steel or sheet aluminum having a thickness which is significantly smaller than a wall thickness of the skillet 2 such as shown in FIG. 3. For example, the plate 4 would have a thickness which is of ⅛–½ of a bottom wall thickness of the skillet, such as 1/32–1/16 inch for the plate and ⅛–¼ inch for the skillet bottom wall. Because the plate 4 has a relatively small thickness in comparison to the skillet, the cooking utensil 1 may be rapidly heated to a desired high temperature when it is inserted into the preheated skillet 2 due to the relatively large mass and thermal inertia of the skillet 2 in comparison to that of the utensil 1.

Further, as also shown in FIG. 3, the bottom surface of the plate 4 will be shaped substantially identically to a lower, inner surface 2' of the skillet 2, and there are no projections or discontinuities projecting from the lower surface of plate 4, so that the plate 4 will substantially completely cover the lower inner surface 2' in flush contact therewith when the utensil 1 is placed in the skillet 2. There is thus achieved a very tight fit and intimate contact between the plate 4 and the lower, inner surface 2' so that there will be very rapid and efficient conduction-type heat exchange between the skillet 2 and a cooking utensil 1 when a food-loaded utensil is placed into the skillet 2; and so that food particles and residue are substantially completely prevented from coming into direct contact with the lower, inner surface 2' of the skillet 2 (and thus from contaminating same). Effectively, the utensil 1 functions as a primary cooking pan/surface, while the skillet functions as a secondary cooking pan or an extended part of the primary cooking pan transferring heat to the utensil 1.

As shown in FIGS. 1 and 2, the cooking utensil 1 may optionally have one or a few small openings 4' defined through a central portion thereof. Such holes are not used as a means for drainage of oils, water or other liquids, noting that there is typically not any free liquid remaining on the cooking utensil 1 after a cooking operation as discussed further below. Rather, the small holes 4' function as an aid in achieving temperature equilibrium or a uniform temperature distribution over the entire surface of the plate 4 during a cooking operation. For example, if a small amount of water becomes trapped between the plate 4 and the lower, inner skillet surface 2' of the skillet 2 when the utensil 1 is placed into the skillet, the holes 4' will permit for the water, as vaporized, to be vented from between the plate 4 and the skillet surface so as to maintain tight, intimate contact between the plate 4 and the skillet surface.

As shown, a lower, inner surface of the skillet 2 and the plate 4 are preferably substantially flat or planar, although these two members may have alternative shapes, such as slightly convex, as long as a tight, intimate contact is achieved therebetween. Additionally, the plate 4 may be modified to have a short lip or a longer side wall member extending upwardly from a peripheral edge thereof and which is shaped to intimately and tightly contact inner side surfaces 2" of the skillet 2.

The skillet 2 is preferably formed of cast iron, cast aluminum or the like with a relatively large wall thickness in comparison to the plate 4, as discussed above, while the cover 3 is preferably constructed from lightweight materials such as sheet aluminum or the like and formed into a substantially dome shape, although it may have a smaller wall thickness than the skillet 2, as shown. The skillet 2 is preferably shallow in height such that the bottom surface 2' thereof has a diameter which is several times longer than the vertical height of the skillet.

Although the skillet 2 and plate 4 are preferably circular in shape as shown, they may be alternatively constructed with other shapes such as elliptical, rectangular, etc. Additionally, the skillet and plate may be as large or as small as desired corresponding to the amount of food to be cooked during a cooking operation, limited only by the ability to locate an appropriately sized skillet and a burner for supporting same.

Methods Of Use

With a cooking utensil having a structure such as discussed above in relation to the preferred embodiment of the invention, foods may be rapidly and efficiently cooked using a combination of a conventional skillet 2 and cover 3 together with one or more of the utensils 1. In general terms, the plate 4 of the cooking utensil substantially fully supports foods thereon as the foods are manipulated during handling and as they are heated during a cooking operation, so that the plate 4 thus functions as the sole or primary cooking surface for the foods. Further, due to the intimate contact between the lower surface of plate 4 and the inner surface 2' of the skillet, little or no food particles and residue are deposited on the inner surface 2' during a cooking operation, but rather such food particles and residue are largely contained on the upper surface of the plate 4. Thus, after foods as supported on the plate 4 have been cooked within the skillet 2, the utensil 1 having the cooked food thereon may be removed from the skillet and the skillet will be immediately ready for further use in cooking additional foods because the inner surface 2' of the skillet will have substantially no food particles or residue thereon, and it will be correspondingly unnecessary to clean the inner surface 2' to avoid contamination of the foods next cooked therein. Instead, another cooking utensil 1 loaded with food, or the same cooking utensil 1 quickly cleaned and reloaded with food, may be directly inserted into the skillet, which remains highly heated from the previous cooking operation, and the foods supported on the subsequently inserted utensil 1 will also be quickly heated and cooked without contamination of the inner surface 2'. As will be understood, this procedure may be repeated over and over again with the utensil(s) being serially placed into the skillet 2 for cooking food supported thereon because the inner surface 2' of the skillet remains substantially clean or contamination-free during all of the cooking operations.

Because the skillet 2 is not cleaned after each operation, as would be necessary with conventional use of the skillet, it can be maintained at a relatively high temperature at all times (including in between cooking operations) and a plurality of foods may be rapidly, serially cooked using the skillet and the utensil(s) 1, noting that it is unnecessary to reheat the skillet from a low or room temperature after each use, as is also necessary when the skillet is cleaned after each use according to conventional practices. Relatedly, a significant quantity of heat is also saved according to the invention in comparison to conventional use of a skillet because the skillet is not cleaned, and hence not cooled down, after each cooking operation. Rather, residual heat from one cooking operation is efficiently utilized in a subsequent cooking operation because the subsequent cooking operation may proceed immediately after the previous cooking operation. Additionally, because the lower surface of the plate 4 is tightly and intimately fitted to the inner surface 2' of the skillet, there is an efficient heat exchange therebetween, again resulting in a very efficient cooking operation; while such tight fit minimizes the possibility of food particles and residue coming into contact with the inner surface 2' of the skillet, so that a tight fit remains assured between the bottom surface of a plate 4 and the skillet surface 2' during each subsequent cooking operation.

Significantly, due to the fact that the inner surface 2' of the skillet 2 remains substantially contamination-free during cooking operations, it is practical to fix the skillet 2 over a heat source such as a stove burner 8 as shown in FIG. 3 using an appropriate fixing means (not shown) such as bolts connected between the skillet handles 10 and a stove surface 12, whereby the skillet 2 may be accurately centered in position over the burner 8 at all times, thus assuring a more uniform temperature over the entire inner surface 2' of the skillet and, hence, a more efficient heat exchange between the skillet and the plate 4.

The apparatus according to the invention is particularly effective for cooking foods such as pasta, and in particular stuffed pasta such as ravioli or Chinese dumplings, according to the following method.

According to such method, a conventional cooking vessel such as the skillet 2 is positioned over a heat source such as the burner 8; one or more of the cooking utensils 1 are loaded with a suitable quantity (which would vary according to the size of the plate 4 and skillet 2) of raw or uncooked pasta product placing one of the food-loaded utensils 1 into the skillet 2, placing the cover 3 over the skillet and heating the skillet, food-loaded utensil and cover to a predetermined high temperature such as 350°–550° F. Such temperature is rapidly achieved because the skillet 2 is normally preheated, either directly and/or due to residual heat from a previous cooking operation, and is normally achieved within 25–45 seconds when the burner 8 is set at a high heat output.

Once the skillet, utensil and cover are brought to the desired temperature, a predetermined quantity of water (which again varies depending on the size of the plate 4, skillet 2, and the amount of food being cooked) is added to the skillet, and the cover 3 is again placed over the skillet such that the cooking utensil 2 and the food supported thereon are enclosed within a space defined by the skillet and cover. For example, if five pounds of stuffed pasta are to be cooked in a 20-inch diameter skillet, then 5–7 ounces of water should be added. Thereafter, the skillet is continued to be heated until substantially all of the added water is evaporated and absorbed into the cooked pasta. Because the skillet 2 and utensil 1 are highly heated before the water is added, much of the water quickly flashes or evaporates immediately after it is added to the skillet, and it normally takes approximately 2–5 minutes for substantially all of the water to be evaporated and/or absorbed into the pasta. The pasta is fully cooked at this point and the utensil 1 may be removed from the skillet and the pasta unloaded therefrom. Most preferably, however, the cooked pasta will not yet be removed, but instead the burner temperature will be significantly reduced to a temperature such as 200°–250° F. and the pasta will be further heated for another predetermined period of time such as 3–5 minutes so as to fry the pasta on the plate 4 and brown surfaces of the pasta. Thereafter, the cooking utensil with the cooked and fried pasta thereon is removed from the skillet, and the process is serially repeated with each of the food-loaded cooking utensils 1.

The cooked and fried pasta resulting from the above process has a particularly appealing flavor, appearance and character, very much in contrast with conventional boiled pasta. Further, the process itself is far quicker and more energy efficient than conventional methods of boiling or frying pasta. Whereas conventional cooking methods require the skillet to cool for cleaning, reloading of food, and/or other purposes, the above process eliminates the time required therefore by sequentially cooking foods in a substantially continuous manner. For example, even with the optional browning step according to the present method, the full period of time necessary to cook the pasta is only 5–8 minutes, which is far less than the average 14–18 minutes required for boiling pasta and the average 12–15 minutes required for frying pasta in a skillet. Further, only a minimally sufficient quantity of water is added to the skillet for cooking the pasta such that all of the water is evaporated and absorbed into the cooked pasta during the pasta preparation so that there is no residual heated water remaining after a cooking operation (as there would be with conventional pasta preparation) and whereby the heated skillet can be immediately used in a subsequent cooking operation as discussed above.

Optionally, a thin film of vegetable oil or the like may be applied to the upper food-supporting surface of the plate 4 by spraying, brushing, etc. prior to loading the food thereon, because such film is helpful in achieving a very favorable browned appearance of the pasta and for removing the cooked pasta from the plate 4 after a cooking operation.

Because the above method may be properly effected according to predetermined time intervals and cooking temperatures, and because the skillet 2 remains substantially clean or uncontaminated during a series of cooking operations and may be fixed in position over the burner 8, the above method for cooking foods such as pasta may favorably be performed in an automated manner.

Although there has been described what is at present considered to be the preferred embodiments of the invention, it will be understood that the invention can be embodied in other specific forms without departing from the spirit or essential characteristics thereof. The described embodiments are, therefore, to be considered in all aspects as illustrative and not restrictive. The scope of the invention is indicated by the appended claims rather than by the foregoing description.

I claim:

1. A cooking utensil for cooking food together with a cooking vessel having a cooking cavity defined therein, comprising:

a food supporting member having an upper surface for supporting food thereon and a bottom surface shaped substantially identically to a lower surface of the cooking cavity of the cooking vessel such that the food supporting member completely covers the lower surface of the cooking cavity in flush contact therewith and an outer peripheral edge of the food supporting member abuts a side wall of the cooking cavity when the food supporting member is placed in the cooking vessel, such that said food supporting member prevents food particles and residue from contacting said lower surface of said cooking cavity during a cooking operation;

said food supporting member being a substantially planar, thin metal plate; and handle means connected to the food supporting member for lifting and manipulating the food supporting member.

2. A cooking utensil according to claim 1, wherein said food supporting member has a substantially uniform thickness at least fifty percent smaller than a thickness of a bottom wall portion of the cooking vessel.

3. A cooking utensil according to claim 1 wherein said food supporting member is formed from sheet metal and has a thickness in the range of 1/32–1/16 inch.

4. A cooking utensil according to claim 1 wherein all lower surfaces of said food supporting member are shaped to flushly contact surfaces of said cooking cavity when said food supporting member is disposed in the cavity.

5. A cooking utensil according to claim 3, wherein: said upper and bottom surfaces of said food supporting member are continuous except for a small number of small openings defined through central portions thereof for assisting in achieving temperature uniformity over the entire food supporting member.

6. A cooking utensil according to claim 1, wherein said handle means is fixed to and extends centrally above said upper surface of said food supporting member.

7. A cooking utensil according to claim 6, wherein said food supporting member and said handle means are formed of metal, and said handle means is fixed exclusively to the central portion of the upper surface of the food supporting member.

8. A cooking utensil for cooking food together with a cooking vessel having a cooking cavity defined therein comprising:

a food supporting member having an upper surface for supporting food thereon and a bottom surface shaped substantially identically to a lower surface of the cooking cavity of the cooking vessel such that the food supporting member substantially completely covers the lower surface of the cooking cavity in flush contact therewith when the food supporting member is placed in the cooking vessel and such that said food supporting member prevents food particles and residue from contacting said lower surface of said cooking cavity during a cooking operation;

said food supporting member being a substantially planar, thin metal plate;

handle means connected to the food supporting member for lifting and manipulating the food supporting member;

said handle means being fixed to and extending centrally above said upper surface of the food supporting member; and said handle means including a plurality of legs having first ends fixed to a central portion of the upper surface of the food supporting member in a uniformly spaced manner, second ends joined together above the central portion of the upper surface of the food supporting member, and a handle member connected to the joined second ends of said legs.

9. A kit for cooking food comprising:

a cooking vessel having a cooking cavity defined therein, a bottom surface shaped to be supported over a heat source and a side wall extending upwardly from said bottom surface;

a plurality of identical food supporting members, each said food supporting member being shaped to be individually, interchangeably disposed within said cooking cavity separately from other said food supporting members;

each said food supporting member having an upper surface for supporting food thereon and a bottom surface shaped substantially identically to a lower surface of said cooking cavity such that the food supporting member completely covers the lower surface of the cooking cavity in flush contact therewith and an outer peripheral edge of said food supporting member abuts said side wall of said cooking vessel when the food supporting member is place therein and such that said food supporting member prevents food particles and residue from contacting said lower surface of said cavity during a cooking operation;

each said food supporting member being a substantially planar, thin metal plate; and each said food supporting member having a handle means fixed to said upper surface thereof for lifting and handling the food supporting member.

10. A kit according to claim 9 wherein each said food supporting member is formed from sheet metal having a substantially uniform thickness, a bottom wall portion of said cooking vessel having a thickness at least twice as large as said substantially uniform thickness of said food supporting members; and each said food supporting member being shaped such that all lower surfaces thereof flushly contact surfaces of said cooking cavity when said food supporting member is placed in the cavity.

11. A kit according to claim 9 further including a cover for covering an upper opening of said cooking vessel such that said cover and said cooking cavity define an enclosed cooking space, a bottom portion of said cooking vessel having a width larger than a height of a side wall portion thereof, and said handle means of each said food supporting member is fixed exclusively to a central portion of said upper surface thereof and extends above said central portion a distance approximately equal to the height of said side wall such that said handle means is fully disposed within said enclosed space when a food supporting member is disposed in the cooking vessel.

12. A kit according to claim 9, wherein said cooking vessel and said food supporting members are formed from metal, and each said handle means includes a plurality of legs having first ends welded to a central portion of the upper surface of the corresponding food supporting member in a uniformly spaced manner, upper ends joined together above said central portion, and a handle member connected to said joined upper ends of said legs.

13. A cooking utensil according to claim 9, wherein: said upper and bottom surfaces of said food supporting member are continuous except for a small number of small openings defined through central portions thereof for assisting in achieving temperature uniformity over the entire food supporting member.

14. A kit according to claim 9, wherein each said food supporting member is formed from sheet metal and has a uniform thickness in the range of 1/32–1/16 inch.

* * * * *